United States Patent [19]
Chapman et al.

[11] 3,894,668
[45] July 15, 1975

[54] WHEEL MOUNTING STRUCTURE FOR VEHICLES

[75] Inventors: George P. Chapman, Birmingham; Lucian L. Chapman, Novi, both of Mich.

[73] Assignee: George P. Chapman, Birmingham, Mich.

[22] Filed: Oct. 18, 1971

[21] Appl. No.: 190,253

[52] U.S. Cl. ......... 224/42.06; 224/42.21; 224/42.24
[51] Int. Cl. .............................................. B60n 9/06
[58] Field of Search.......... 224/42.06, 42.24, 42.12, 224/42.13, 42.45 R, 42.21, 42.04, 42.03 R; 214/451, 454

[56] References Cited
UNITED STATES PATENTS

| | | | |
|---|---|---|---|
| 1,234,409 | 1917 | Strifler | 224/42.12 |
| 2,193,229 | 3/1940 | Exner | 293/63 |
| 2,931,549 | 4/1960 | Adkins | 224/42.24 |
| 3,302,836 | 2/1967 | Herndon | 224/42.24 |
| 3,428,230 | 2/1969 | Korf et al. | 224/42.06 |

FOREIGN PATENTS OR APPLICATIONS

| | | | |
|---|---|---|---|
| 1,092,433 | 11/1954 | France | 224/42.21 |

*Primary Examiner*—Robert J. Spar
*Assistant Examiner*—Jerold M. Forsberg
*Attorney, Agent, or Firm*—Hauke, Patalidis & Dumont

[57] ABSTRACT

A supporting structure for mounting a spare wheel and tire on a vehicle, including upper and lower bracket members each secured at one end to vehicle structure or to a secondary mounting plate or plates, in turn secured to vehicle structure, the bracket members extending outwardly from the vehicle and connected at their other ends by intermediate web members which lie in vertical planes extending normal to air flow through a wheel which is secured to the assembly. Modifications include single and double intermediate web members, bracket members which extend from the vehicle in parallel spaced planes or are sloped toward each other, wheel connecting bolt elements which are secured to wheel lug bolt holes and are adjustable for adaptation to various sized wheels, secondary supporting brackets which are adaptable for mounting to different parts of the vehicle structure, and secondary support brackets which are hinged to permit the wheel to swing either downwardly or to the side from the normal carrying position.

37 Claims, 18 Drawing Figures

SHEET 1

LUCIEN L. CHAPMAN
GEORGE P. CHAPMAN
INVENTORS

BY
Hauke Gifford & Patalidis
Attorneys

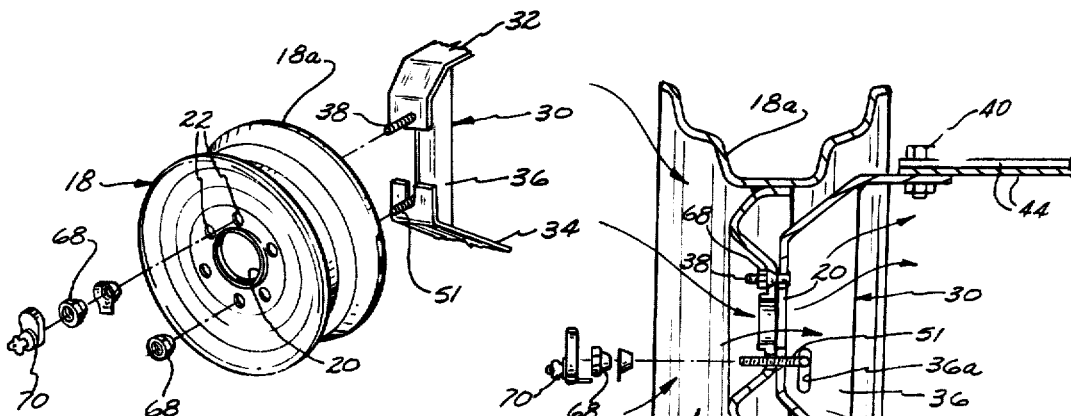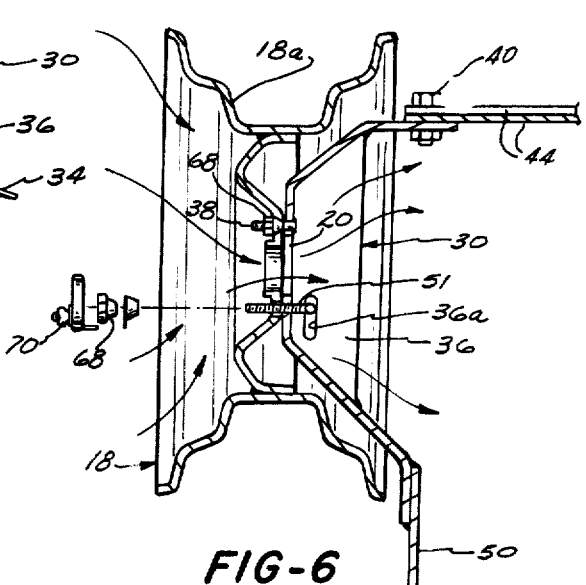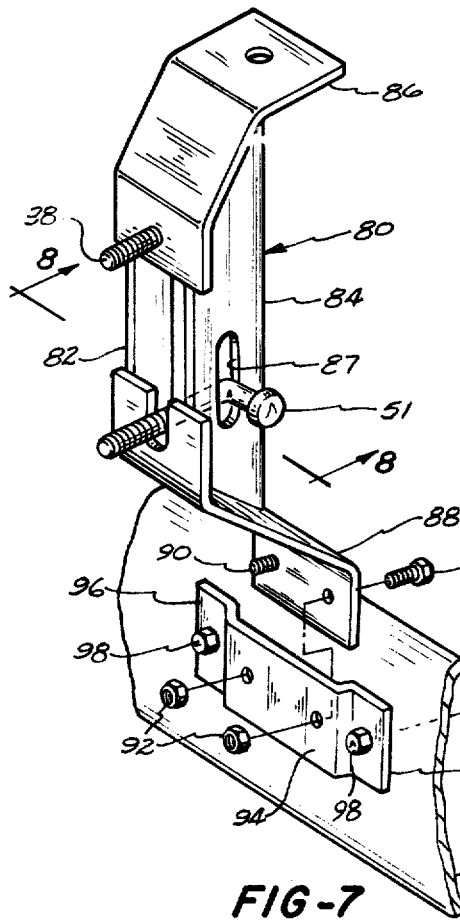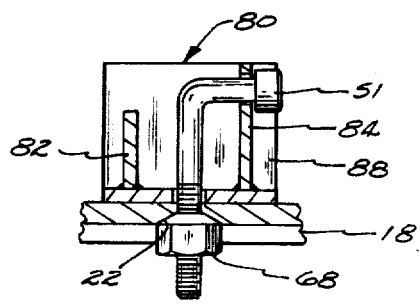

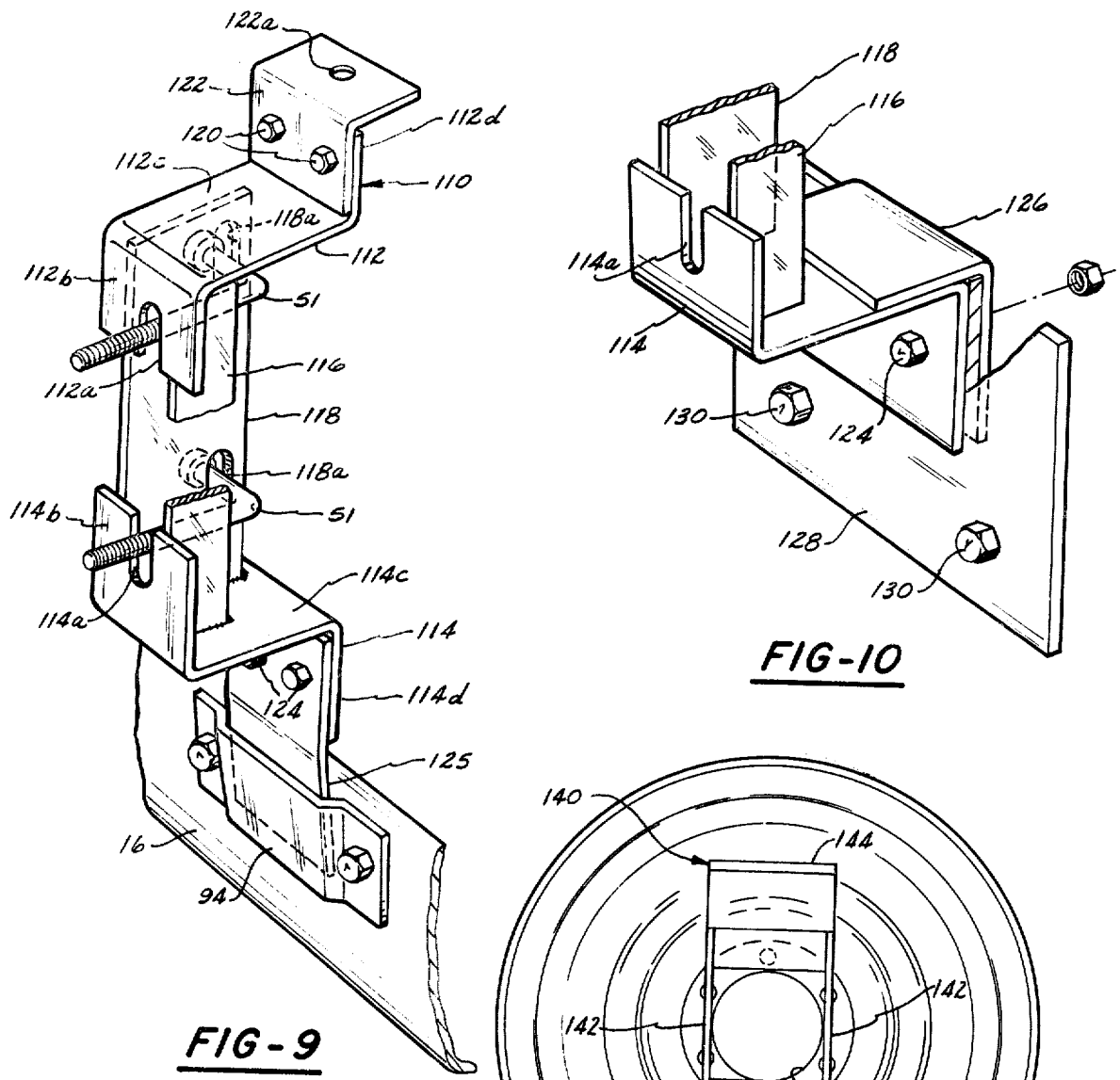

SHEET 4
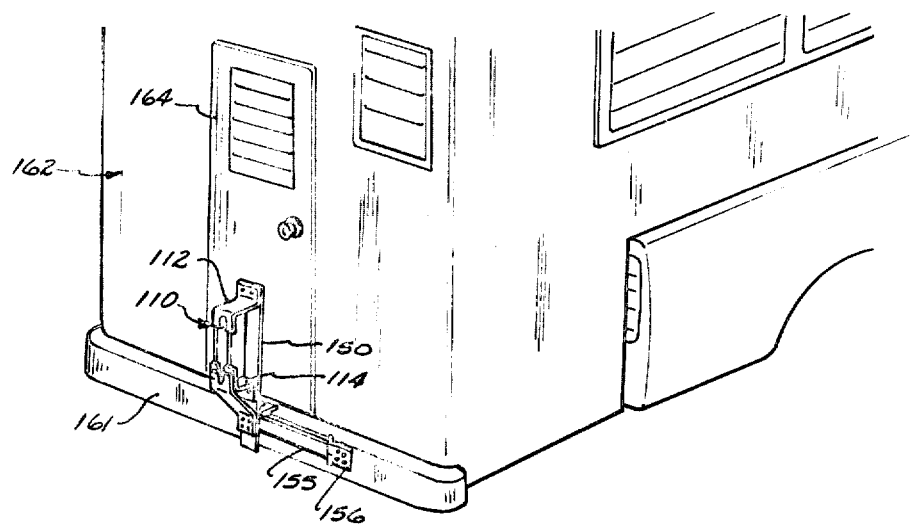
FIG-12
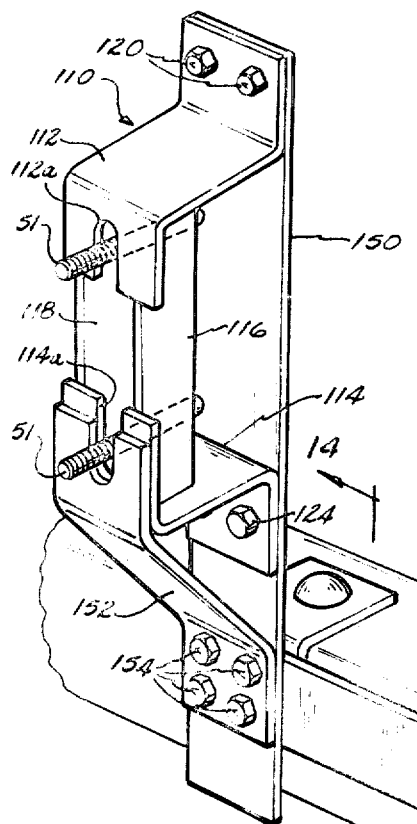
FIG-13
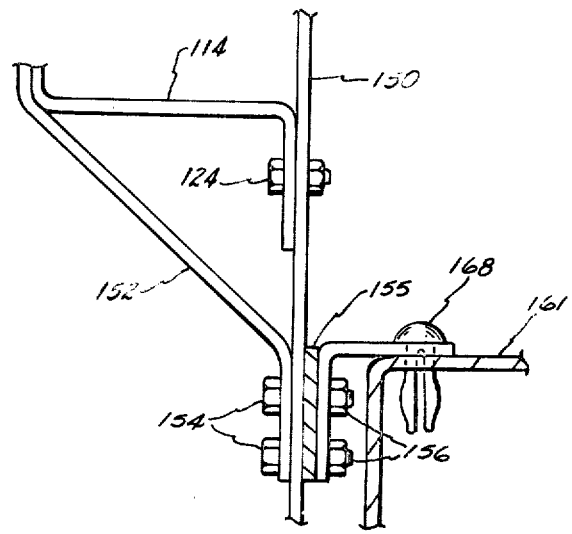
FIG-14
LUCIEN L. CHAPMAN
GEORGE P. CHAPMAN
INVENTORS
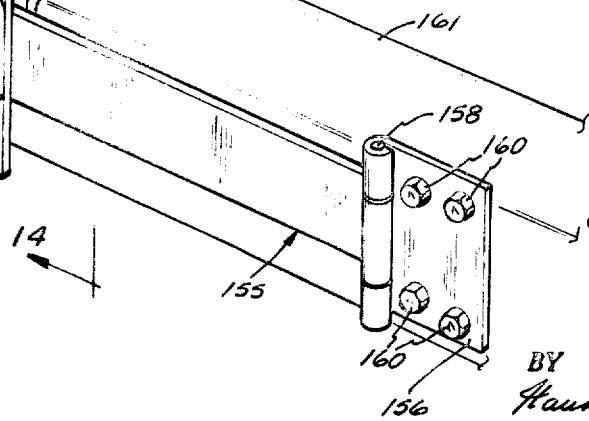
BY
Hauke Gifford & Patalidis
Attorneys

LUCIEN L. CHAPMAN
GEORGE P. CHAPMAN
INVENTORS

BY
Hauke Gifford & Patalidis
Attorneys

WHEEL MOUNTING STRUCTURE FOR VEHICLES

BACKGROUND OF THE INVENTION

A. Field of the Invention

Our invention relates to bracket structures for carrying a spare wheel exteriorly of a vehicle, and more particularly to inexpensive structures which can be selectively assembled in various fashions and which provide for minimum impedance to air flowing through wheels mounted forward of the vehicle radiator.

B. Description of the Prior Art

Various spare wheel mount structures have previously been patented, for example as disclosed in U.S. Pat. Nos. 1,848,975; 2,621,837; 2,772,826; 3,387,754; and 3,482,749.

One of the major drawbacks to wheel mount structures such as the above, which has prevented wide acceptance of front mounted wheels, is that they obstruct air flow to the vehicle radiator to such a significant extent that engine overheating occurs.

Another disadvantage is that wheel mounts are generally adaptable for mounting only to a particular vehicle structure, and are rather complicated assemblies and hence expensive to manufacture.

SUMMARY OF THE INVENTION

Our invention avoids the above problems in that the mounting structures are readily manufactured from simple stampings which can be readily bolted, welded or otherwise assembled for superior wheel supporting characteristics, and which also permit substantially unobstructed cooling air flow through the wheel when mounted in front of a vehicle radiator. Additionally, the parts of the support structure are readily adjustable for adaptation to different vehicle designs, and for mounting various sized wheels.

BRIEF DESCRIPTION OF THE DRAWINGS

For a more complete understanding of the invention, reference may be had to the accompanying drawings illustrating various embodiments of the invention in which like reference characters refer to like parts throughout the several views, and in which:

FIG. 5 is a fragmentary exploded perspective view illustrating the mounting of a wheel to a support bracket such as the one illustrated in FIG. 2;

FIG. 6 is a longitudinal vertical cross-sectional and partially exploded view of a preferred wheel mounting structure and wheel supported thereby;

FIG. 7 is a perspective and partially exploded view of another modification of the wheel mounting structure of the invention;

FIG. 8 is a cross-sectional view taken substantially along the line 8—8 of FIG. 7;

FIG. 9 is a perspective view illustrating yet another modification of the wheel mount structure of the invention;

FIG. 10 is a fragmentary perspective view of a portion of another preferred embodiment of the wheel mount structure;

FIG. 11 is an elevational view illustrating yet a further embodiment of the invention;

FIG. 12 is a perspective view illustrating another embodiment of the wheel mounting structure as adapted to the rear of a vehicle such as a camper or trailer;

FIG. 13 is an enlarged fragmentary perspective view of the mounting structure shown in FIG. 12;

FIG. 14 is a fragmentary cross-sectional view taken substantially along the line 13—13 of FIG. 12;

DESCRIPTION OF THE PREFERRED EMBODIMENTS

Figure 1:
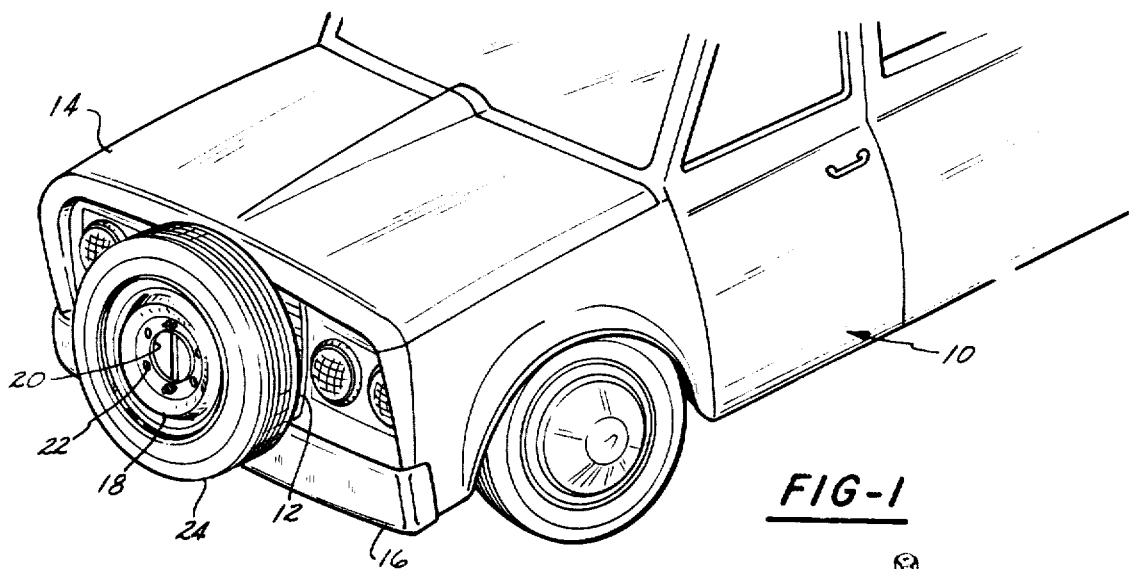
FIG. 1 is a fragmentary perspective view of a vehicle illustrating a spare wheel and tire carried forward of the vehicle radiator.

FIG. 1 illustrates a vehicle 10 having a front end radiator grill 12, engine hood 14 and front bumper 16. A spare wheel 18, having a rim 18a and a central aperture 20 peripherally surrounded by a plurality of mounting lug holes 22 and carrying a tire 24, is arranged for mounting on the front end of the vehicle 10, forwardly spaced from but adjacent the radiator grill 12 through which air must flow to the vehicle for engine cooling.

Figure 2:
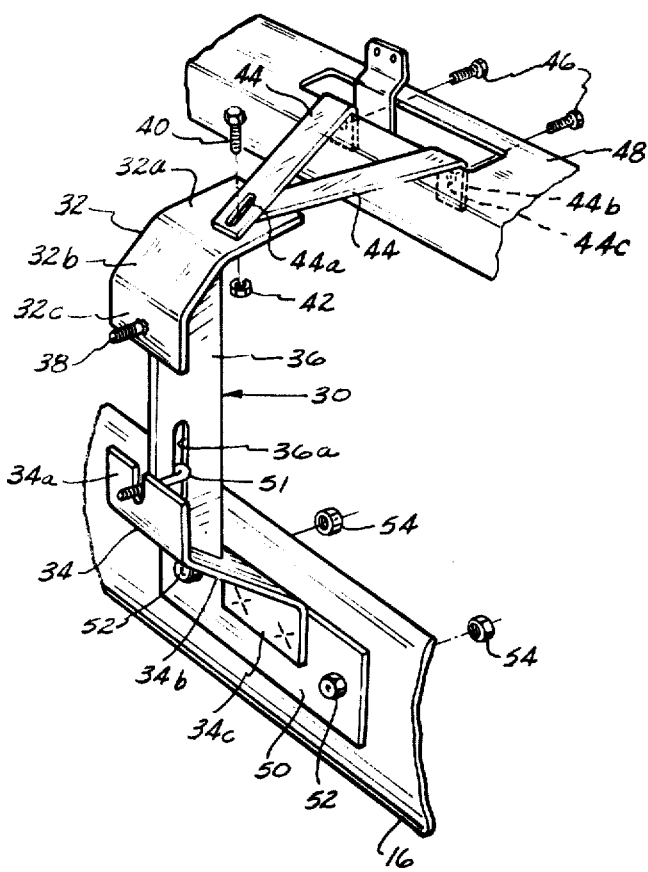
FIG. 2 is a fragmentary perspective and partially exploded view, illustrating a preferred wheel carrying structure embodiment of the invention as adapted for mounting on vehicle structure.

A preferred wheel mounting structure is illustrated in FIG. 2 as comprising a primary bracket assembly 30 formed from three relatively simplified sheet metal stampings; namely, an upper bracket member 32 and lower bracket member 34 spaced and connected by an intermediate web member 36, whose ends are preferably welded integrally to the upper and lower bracket members.

The upper bracket member 32 is formed as shown with an upper horizontal portion 32a, an intermediate sloped portion 32b and a forward downwardly extending vertical portion 32c having secured thereto and extending therefrom a threaded stud element 38.

The upper horizontal portion 32a of the bracket member 32 is perforated for assembly by any means, such as a bolt 40 and nut 42, with a pair of straps or secondary bracket members 44 each having an elongated slot 44a at one end for adjustable pivotal connection by the bolt 40 to the bracket portion 32a, and a downturned flange 44b at the other end having an elongated slot 44c for adjustable attachment by bolts 46 or the like to radiator framing structure 48 as shown, which is above the radiator grill 12 and beneath the engine hood 14 of the vehicle 10.

The lower bracket assembly 34 comprises a forward upwardly extending vertical portion 34a disposed in the plane of the upper bracket portion 32c, an intermediate sloped portion 34b and a lower downwardly extending vertical portion 34c welded or otherwise secured to a lateral lower secondary mounting bracket 50 adapted to be secured to the vehicle bumper 16 by any means such as bolts 52 and nuts 54.

The intermediate web member 36 comprises a single verticle flat plate having, as shown, a vertically elongated slot 36a through which extends the head end of an L-bolt 51, whose threaded shank end extends forwardly through a slot provided in the forward vertical portion 34a of the lower bracket member 34, so that it may be adjusted toward and away from the stud element 38 for adaptation to differently sized wheels.

The upper straps or secondary bracket members 44 will be seen to be pivotally and slidably adjustable for the purpose of adapting the bracket assembly 30 to vehicles having varying types of framing structure 48 and disposed at various dimensions relative to the position of the vehicle bumper 16, to locate the bracket assembly 30 at a preferred vertical or near vertical position.

Figure 3:
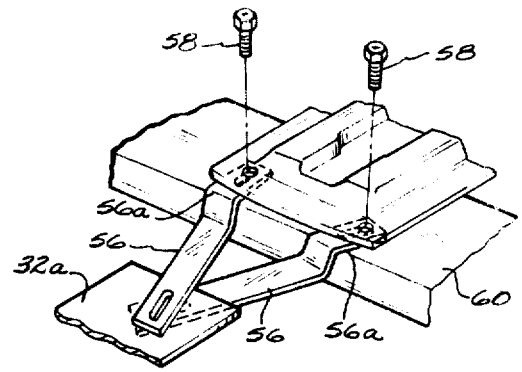
FIGS. 3 and 4 are fragmentary perspective views illustrating modifications of secondary bracket structures adapted for connecting the primary bracket structure of FIG. 2 to various vehicle configurations.

In FIG. 3, secondary bracket members 56 of somewhat different configuration are illustrated as having offset flanges 56a adapted for attachment by any means such as bolts 58 to a horizontal portion of a different type of radiator framing structure 60.

Figure 4:
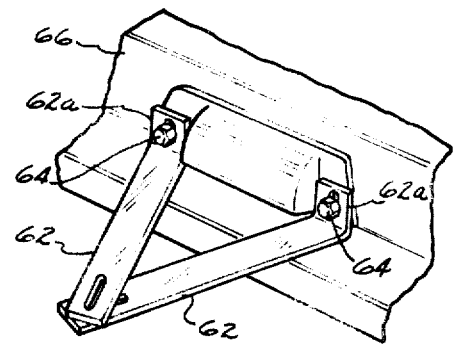

FIG. 4 illustrates secondary bracket members 62 having upturned flanges 62a for attachment by any means such as bolts 64 to a forwardly facing vertical portion of yet a different type of radiator framing structure 66.

Thus, the primary bracket assembly 30 is made readily adaptable, by the replacement of relatively simple, inexpensive secondary bracket members, and by the adjustability thereof in various directions, to a very wide variety of vehicle front end configurations.

FIGS. 5 and 6 illustrate how the spare wheel 18 is mounted, with the stud element 38 and threaded end of the L-bolt 51 extending through mounting lug holes 22 and secured by lug nuts 68, one of which may be provided with the elements of a conventional lug nut lock 70.

It will be seen that when mounted in front of the vehicle radiator grill 12, cooling air for the radiator which might otherwise be impeded is, by virtue of the space between the upper and lower primary bracket assembly members 32 and 34 and the unobstructing position of the intermediate web member 36, actually scooped toward the aperture 20 by the wheel rim 18a and passes through the wheel and mounting structure to the radiator as indicated by the flow arrows in FIG. 6.

FIGS. 7 and 8 illustrate another preferred embodiment of the invention as comprising a primary bracket assembly 80 similar to the assembly 30 of FIGS. 2, 5 and 6, but having two intermediate bracket members 82 and 84 disposed in parallel vertical planes and interconnecting spaced upper and lower bracket members 86 and 88, which are welded or otherwise affixed to the members 82 and 84. The bracket member 84 preferably is of greater width than the bracket member 82 to accommodate a vertically elongated slot 87 through which extends the head end of the adjustable L-bolt 51 for securing the wheel with the lug nut 68 as shown in FIG. 8.

The upper bracket member 86 is the same as the member 32 of FIG. 2, but the lower bracket member 88 is adapted for connection by means of bolts 90 and nuts 92 for selective attachment either directly to vehicle structure or to a secondary bracket member 94 provided with end flanges 96 adapted for attachment by any means, such as bolts 98 and nuts 100, to the bumper 16 of the vehicle to embrace the member 88 as indicated.

The pair of intermediate members 82 and 84 provide increased supporting strength to the structure over the single intermediate member 36 of FIG. 2, but still with a minimum of resistance to cooling air flow.

FIG. 9 illustrates another modification of the invention comprising a primary bracket assembly 100, having an upper bracket member 112 and lower bracket member 114 connected by a pair of vertical parallel intermediate bracket members 116 and 118.

The member 118 is provided with a pair of spaced vertically elongated slots 118a through which extend the head ends of a pair of L-bolts 51, whose threaded shank ends extend through slots 112a and 114a provided as shown in the respective forward vertical portions 112b and 114b of the upper and lower bracket members 112 and 114. The forward portions 112b and 114b respectively are formed integrally with parallel horizontally extending intermediate portions 112c and 114c, which are further respectively integrally formed with upwardly and downwardly extending vertical portions 112d and 114d of the bracket members 112 and 114. The portion 112d is preferably adapted for connection by bolts 120 to an angle bracket 122, provided with a bolt hole 122a for selective connection to secondary bracket members similarly as illustrated and described in relation to the structure in FIG. 2.

The lower bracket portion 114d is adapted for connection by bolts 124, either to the secondary bracket member 94 shown in FIG. 7 or to a plate 125 which is removably held by the bracket member 94 by insertion between it and the front face of the bumper 16, or may be secured as seen in FIG. 10 to an angle bracket 126 with a secondary mounting bracket 128 sandwiched between them and adapted for connection by any means such as bolts 130 to vehicle structure (not shown).

FIG. 11 illustrates a further modification of the invention comprising a primary bracket assembly 140 somewhat similar to the bracket assembly 80 of FIG. 7, but made considerably wider so that vertical parallel intermediate bracket members 142, connecting spaced upper and lower bracket members 144 and 146, will clear lateral diametrically spaced edges of the wheel aperture 20 to further be clear of air flow therethrough. This bracket assembly may be formed from a single stamping.

FIGS. 12 through 16 illustrate hinged structures adapting the primary bracket assembly 110 of FIG. 9 (or any of the other disclosed primary bracket assemblies) to other parts of a vehicle. For example, FIGS. 12–14 show the upper and lower bracket members 112 and 114 secured by the bolts 120 and 124 respectively to a vertical elongated strap 150 which, together with a lower angular brace 152 secured by any means such as welding to the front portion of the bracket 114, is secured by bolts 154 and nuts 156 to a laterally extending secondary bracket assembly 155, which is pivotable with an end hinge plate 156 on a vertical hinge pin 158. The hinge plate 156 is adapted for mounting by any means, such as bolts 160, to the rear bumper 161, for example, of a camper vehicle 162 so that the bracket assembly 110 with a wheel attached thereto may be swung to the side to clear access to a door 164 of the vehicle 162.

Also secured by the bolts 154 and nuts 156 to the secondary bracket assembly 155 is an angle bracket 166 adapted to rest on the bumper 161 for support and be removably connected thereto by any means, such as a snap-in fastener 168, as illustrated in FIG. 14.

Figure 15:
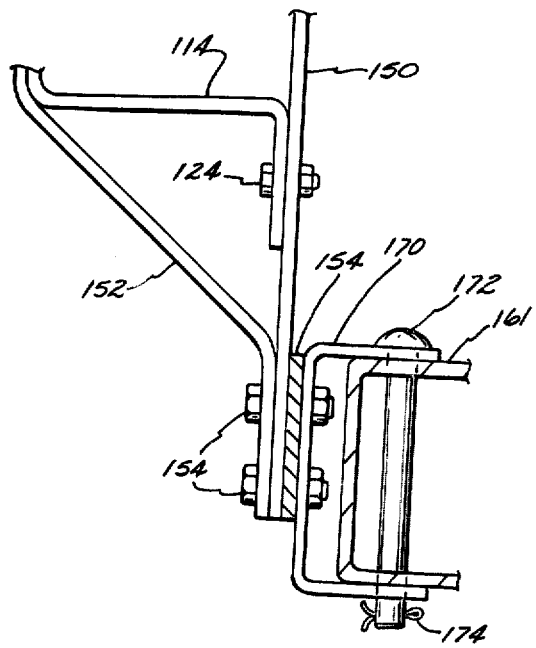
FIG. 15 is a fragmentary cross-sectional view of a modification of the structure shown in FIGS. 12 and 13.

Alternatively, as shown in FIG. 15, the angle bracket may instead be replaced by a channel bracket 170 which embraces the bumper 161 and is removably secured thereto by means of a through bolt 172 and cotter pin 174.

Figure 16:
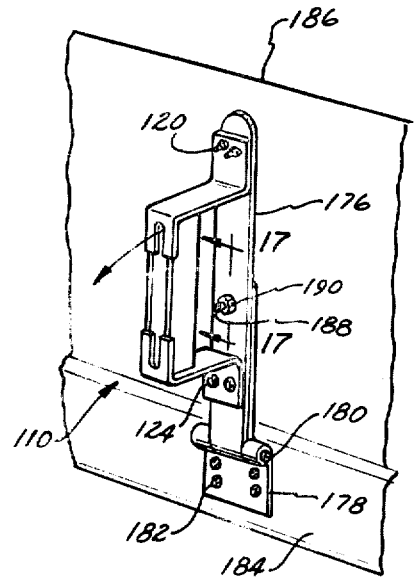
FIG. 16 is a fragmentary perspective view illustrating another embodiment of a wheel supporting structure hinged to the rear of another vehicle such as a pick-up truck having a tail gate.
Figure 17:
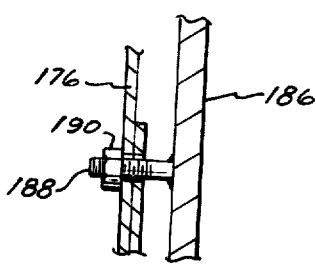
FIG. 17 is a fragmentary cross-sectional view taken substantially on the lines 17—17 of FIG. 16.

The same primary bracket assembly 110 may alternatively, as shown in FIGS. 16 and 17, be secured by the bolts 120 and 124 to a vertical strap 176 pivoted with a lower hinge plate 178 on a horizontal hinge pin 180, the hinge plate 178 being adapted for mounting by any means such as bolts 182 to the rear bumper 184 of a pick-up truck vehicle provided with a downward swinging tail gate 186.

A stud 188 may be affixed to the tail gate 186 and located to pass through the strap 176, removably retaining this strap 176 and the bracket assembly 110 connected thereto by any means such as a stud nut 190, as illustrated in FIG. 17.

Thus, when the nut 190 is removed, the strap 176 with its attached primary bracket 110 and wheel (not shown) may be pivoted downwardly to permit dropping of the tail gate 186.

Figure 18:
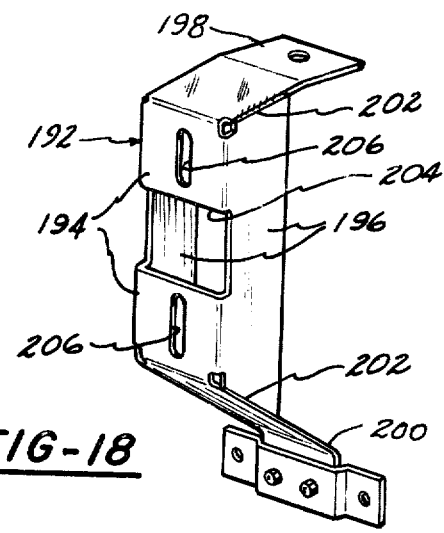
FIG. 18 is a perspective view illustrating yet another embodiment of the invention.

FIG. 18 illustrates a further embodiment of the invention comprising a primary bracket assembly 192 formed of a single sheet of metal bent to provide a base web member 194, side members 196, and end members 198 and 200 whose side edges are preferably welded to the end edges of the side members 196 as indicated at 202.

The base web member 194 has its center cut out to form an aperture 204 extending across the base web member 194 to the side members 196 as shown, and arranged to register with the aperture of a wheel, either within or outside the space of the wheel aperture. The side members 196 preferably extend normal to the base web member 194 so as not to obstruct air flow through the aperture 204.

Each remaining end of the base web member 194 is provided with a preferably elongated slot 206 adapted for connection by any means such as bolts (not shown) or the like to bolt holes on opposite sides of the wheel aperture.

Although we have illustrated only a few embodiments of the invention, it will be apparent to one skilled in the art to which the invention pertains that various changes and modifications may be made therein without departing from the spirit of the invention or the scope of the appended claims.

We claim:

1. A structure for mounting on a vehicle a spare wheel having a central aperture through which air may flow, said structure comprising spare wheel securing means, a bracket in part extending across said aperture and adapted for supporting connection to the vehicle and to said securing means, and substantially all portions of said bracket which extend across said aperture being formed of one or more elongated planar members disposed substantially normal to the plane of said aperture to offer a minimum resistance to air flow therethrough, wherein the securing means comprises bolt elements adapted for securing opposite ends of said planar member to mounting lug holes on opposite sides of said wheel central aperture, at least one end of said planar member has an aperture therein and at least one of said bolt elements has an L-shaped shank with a head on one end and adapted to fit through said planar member aperture to extend the other end parallel to the plane of said planar member.

2. The structure of claim 1 wherein said bracket is formed to hold said wheel spaced from the vehicle a distance to avoid interference between vehicle structure and a tire carried by said wheel.

3. The structure of claim 1 wherein said bracket has two spaced end portions connected to and extending from opposite ends of said planar member, the end of each end portion remote from said planar member having means adapted for securing to vehicle structure.

4. The structure of claim 1 including means adjustably varying the spacing of said bolt elements.

5. The structure of claim 4 wherein one of said bolt elements is immovably affixed to said bracket and the other of said bolt elements is adjustable toward and away from the affixed bolt element.

6. The structure of claim 1 wherein said planar member aperture is elongated in the direction of extension of said planar member across said wheel aperture.

7. The structure of claim 1 wherein each end of said planar member has an aperture therein and said bolts each include an L-shaped shank with a head on one end and adapted to fit through a planar member aperture to extend the other end parallel to the plane of said planar member.

8. The structure of claim 1 wherein said bracket includes a pair of spaced elongated support plates each adapted for securing to and extending outwardly of vehicle structure, and said planar member comprises a flat elongated plate having its ends connected respectively with the ends of said support plates most remote from said vehicle structure.

9. The structure of claim 8 wherein said support plates are formed to extend in parallel planes outwardly from the vehicle structure.

10. The structure of claim 8 wherein said support plates are formed to extend convergingly outwardly from the vehicle structure.

11. The structure of claim 1 wherein said bracket comprises a pair of spaced elongated support plates each adapted for securing to and extending outwardly of vehicle structure, and said planar member comprises a single elongated plate having its ends connected respectively with the ends of said support plates most remote from said vehicle structure.

12. The structure of claim 1 wherein said bracket includes a pair of spaced elongated support plates each adapted for securing to and extending outwardly of vehicle structure, and said planar member comprises a pair of spaced parallel flat elongated plates each having its ends connected respectively with the ends of said support plates most remote from said vehicle structure.

13. The structure of claim 12 wherein said securing means comprises bolt holes, and said structure includes a pair of spaced bolt elements adapted for securing to bolt holes on opposite sides of said wheel aperture.

14. The structure of claim 13 including means adjustably varying the spacing of said bolt elements.

15. The structure of claim 14 wherein one of said bolt elements is immovably affixed to said bracket and the other of said bolt elements is adjustable toward and away from the affixed bolt element.

16. The structure of claim 13 wherein said bolt elements are adapted for securing to opposite ends of one of said elongated plates.

17. The structure of claim 16 wherein at least one end of the elongated plate to which a bolt element is adapted to be secured has an aperture therein and the bolt includes an L-shaped shank with a head on one end and adapted to fit through said plate aperture to extend the other end parallel to the plane of said plate.

18. The structure of claim 17 wherein said plate aperture is elongated in the direction of extension of said plates across said wheel aperture.

19. The structure of claim 16 wherein each end of the elongated plate to which the bolt elements are adapted to be secured has an aperture therein and said bolts each include an L-shaped shank with a head on one end and adapted to fit through a plate aperture to extend the other end parallel to the plane of said plate.

20. The structure of claim 19 wherein said plate apertures are elongated in the direction of extension of said plates across said wheel aperture.

21. The structure of claim 1 wherein said support bracket comprises at least in part an integral plate extending across said wheel aperture and formed to channel shape with a center base portion connecting side edges of a pair of spaced parallel web portions which constitute said planar members of said bracket, said bracket being adapted for securing to said wheel and said vehicle with the web portions disposed therebetween.

22. The structure of claim 21 wherein said base portion has an aperture between said web portions substantially to the extent of said wheel aperture.

23. The structure of claim 21 wherein ends of said base portion are formed to extend angularly from said web portion side edges and in the direction of said web portions.

24. The structure of claim 1 wherein said support bracket comprises a channel shaped member extending across said wheel aperture and having a base web member provided at its ends with means for securing to said wheel at opposite sides of said aperture and a central aperture for air-flow therethrough, said channel including side members constituting the planar members of the bracket and being integral with said base web member and extending normal thereto, and end members extending from opposite ends of said channel base web member in the direction of said side members and having means at the extremities thereof for securing to vehicle structure.

25. The structure of claim 24 wherein the base web, side and end members are formed of an integral plate bent to channel shape and with the end members having side edges abutting end edges of said side members.

26. The structure of claim 24 wherein the aperture in said web member extends laterally across same between said side members.

27. The structure of claim 3 wherein said means adapted for securing to vehicle structure in part comprises a pair of elongated hanger elements each having one end pivotally secured to one bracket end portion and the other ends adapted to be secured to laterally spaced attachment points of said vehicle, said hanger elements being pivotal to diverge at variably selective angles to adapt to variously spaced vehicle attachment points.

28. The structure of claim 27 wherein the ends of said hanger elements have elongated apertures adapted to receive mounting fasteners adjustably for varying the spacing of said bracket from said vehicle.

29. The structure of claim 27 wherein the ends of said hanger elements have means selectively removably securable to said bracket and said vehicle attachment points.

30. The structure of claim 3 wherein said means adapted for securing to said vehicle structure in part comprises and elongated plate extending from one of said end portions and pivotally provided on its remote end with a hinge plate adapted for securing to said vehicle.

31. The structure of claim 30 wherein said elongated plate is formed for supporting engagement with a vehicle bumper.

32. The structure of claim 30 wherein said elongated plate extends in a direction substantially parallel to said bracket elongated planar member.

33. The structure of claim 30 wherein said elongated plate extends in a direction substantially normal to said bracket elongated planar member.

34. The structure of claim 33 wherein said elongated plate is formed for supporting engagement with a vehicle bumper.

35. The structure of claim 34 wherein said elongated plate at least in part is channel shaped with a center base portion and side webs spaced to embrace the top and bottom sides of a vehicle bumper.

36. The structure of claim 35 including a securing element connected between said side webs to retain said bumper between the center base portion and said securing element and between said side webs.

37. The structure of claim 34 including means locking said elongated plate to such vehicle bumper.

* * * * *